United States Patent
Bialer et al.

(10) Patent No.: US 10,539,645 B2
(45) Date of Patent: Jan. 21, 2020

(54) ANGLE OF ARRIVAL ESTIMATION

(71) Applicant: GM GLOBAL TECHNOLOGY OPERATIONS LLC, Detroit, MI (US)

(72) Inventors: Oded Bialer, Petah Tivak (IL); Igal Bilik, Rehovot (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 346 days.

(21) Appl. No.: 15/405,523

(22) Filed: Jan. 13, 2017

(65) Prior Publication Data

US 2017/0212205 A1    Jul. 27, 2017

Related U.S. Application Data

(60) Provisional application No. 62/281,822, filed on Jan. 22, 2016.

(51) Int. Cl.
*G01S 3/48* (2006.01)
*G01S 13/42* (2006.01)
*G01S 3/50* (2006.01)

(52) U.S. Cl.
CPC .............. *G01S 3/48* (2013.01); *G01S 3/50* (2013.01); *G01S 13/42* (2013.01)

(58) Field of Classification Search
CPC ... G01S 3/48; G01S 3/50; G01S 13/42; G01S 13/426; G01S 13/428; H01Q 3/42
See application file for complete search history.

(56) References Cited

U.S. PATENT DOCUMENTS

| | | | | |
|---|---|---|---|---|
| 3,803,612 A | * | 4/1974 | Alcock | G01S 3/48 342/424 |
| 5,724,047 A | * | 3/1998 | Lioio | G01S 3/48 342/417 |
| 9,958,527 B2 | | 5/2018 | Tuxen | |
| 2008/0204322 A1 | * | 8/2008 | Oswald | G01S 13/0209 342/465 |
| 2014/0269389 A1 | | 9/2014 | Bukkfejes et al. | |
| 2017/0029107 A1 | * | 2/2017 | Emami | G01S 13/42 |

FOREIGN PATENT DOCUMENTS

| CN | 104094135 A | 10/2014 |
|---|---|---|
| CN | 105026948 A | 11/2015 |

OTHER PUBLICATIONS

Office Action issued by the National Intellectual Property Administration(CNIPA) for application CN 201710042329.8 dated Aug. 26, 2019.

* cited by examiner

*Primary Examiner* — Bernarr E Gregory
*Assistant Examiner* — Fred H Mull
(74) *Attorney, Agent, or Firm* — Reising Ethington, P.C.

(57) ABSTRACT

A method is disclosed for determining an angle of arrival of an incident plane wave received by an antenna array. The method includes receiving signals from a plurality of antenna receiving channels, determining a set of possible angles of arrival of the incident plane wave based on the signals received at the plurality of receiving channels, measuring a pulse delay of the incident plane wave between the signals received at the plurality of receiving channels, and calculating the angle of arrival of the incident plane wave based on the set of possible angles of arrival and the measured pulse delay.

20 Claims, 2 Drawing Sheets

ANGLE OF ARRIVAL ESTIMATION

This application claims the benefit of U.S. provisional patent application No. 62/281,822, filed on Jan. 22, 2016, the entire contents of which are hereby incorporated by reference.

TECHNICAL FIELD

The present invention relates generally to radar systems, and more particularly, to estimating an angle of arrival in an antenna array having widely-spaced elements.

BACKGROUND

Radars are object-detection systems that use radio waves transmitted and received by an antenna to determine the range, angle, and/or velocity of objects. In most modern systems, radars employ an array antenna consisting of multiple antenna elements that are arranged and interconnected to form an individual antenna. In operation, the phase difference between the signals received by the antenna elements is measured and used to establish the signal arrival direction. For example, if the antenna elements are located on a planar surface and if the signal arrives normal to the surface, then the signal outputs of each antenna element are in phase, and the relative phase difference between the elements is ideally zero. If the signal arrives obliquely to the plane, the phase differences between the elements vary depending on the signal frequency, the distance between the antenna elements, and signal direction. In other words, due to the difference in propagation distances from the signal source to the individual antenna elements, each antenna element observes a different phase shift of the signal. This phase shift can then be used to determine the arrival direction of the incoming signal.

There are a number of known methods for determining the angle of arrival of an incident signal based on the phase difference between antenna elements. The basic relationship, however, is best explained by examining a two element linear array 10, as shown in FIG. 1. The antenna elements 12a, 12b are spaced apart by a distance "d" and the angle of arrival of the incident signals 14 forming wave front 16 is $\theta$, which has a span of 180°. The arrival angle $\theta$ is referenced from an axis perpendicular to the plane of the array (i.e., broadside to the array) and ranges in angle from $\pi/2$ to $-\pi/2$ (90° to −90°). In an array designed to radiate broadside to the antenna array, the radiation pattern is at a minimum at $\pi/2$ and at $-\pi/2$ (90° and −90°), and becomes a maximum broadside to the array at 0 (0°). As understood by those skilled in the art, the angle of arrival can also be referenced from the axis of the array. In that case, $\theta$ still has a span of 180°, but instead ranges from 0 to $\pi$ (0° to 180°) with minimums at 0 and $\pi$ (0° and 180°) and a maximum at $\pi/2$ (90°).

Antenna arrays are directional in that they are designed to focus the antennas radiation pattern towards a particular direction by combining the antenna elements with phase adjustments that are a function of the direction of arrival. The direction of the radiation pattern is given by the main beam lobe, which is pointed in the direction where the bulk of the radiated power travels. The directivity and gain of an antenna array can be expressed in terms of the antenna's normalized field strength and array factor, which are fundamental principles of antenna array theory and well known in the art. For example, referring again to FIG. 1, the normalized field strength $E(\theta)$ at an angle $\theta$ measured off broadside is proportional to $(\sin N\Psi/2)/(N \sin \Psi/2)$, where N is the number of antenna elements in the array, $\Psi$ is the phase difference between adjacent antenna elements and is equal to $2\pi d/\lambda(\sin \theta)$, wherein $\lambda$ is the wavelength and $d(\sin \theta)$ represents the linear distance of the propagation delay of the wave front 16 between adjacent antenna elements. The angle of arrival $\theta$ of the incident signals 14 can therefore be determined by knowing the phase difference $\Psi$.

A problem arises, however, because the phase between the elements can only be measured without ambiguity over a 180° range. When the antenna elements are widely-spaced (i.e., when distance between antenna elements exceeds one half of the wavelength of the incident signal), the phase difference between antenna elements can span more than 360°. Consequently, more than one possible arrival of arrival can be obtained and are commonly referred to as ambiguities.

The ambiguities caused by widely-spaced antenna arrays result in grating lobes, which refer to a spatial aliasing effect that occurs when radiation pattern side lobes become substantially larger in amplitude, and approach the level of the main lobe. Grating lobes radiate in unintended directions and are identical, or nearly identical, in magnitude to the main beam lobes. For example, referring above to the normalized field strength equation $E(\theta)$, a maxima occurs when the denominator is zero, or when $\sin \theta = \pm n/(d/\lambda)$ where $n = 0, 1, 2, 3 \ldots$ In arrays where the spacing between antenna elements d is equal to half the wavelength, the array produces a single maximum (i.e., main lobe) in the visible region of the array in the direction $\theta = 0°$. In arrays where the spacing between antenna elements d is greater than half the wavelength, additional maxima appear in the visible region at angles other than the direction of the main lobe. For instance, when the spacing between antenna elements is $2\lambda$, the main lobe appears at $\theta = 0°$, but grating lobes also appear at $\theta = \pm 30°$ and $\pm 90°$. Because each of these angles corresponds to a maxima, the radar system in not capable of distinguishing between the angle of arrival corresponding to the main lobe and the angles of arrival corresponding to the grating lobes. Stated another way, a single phase measurement may refer to multiple angles of arrival resulting in additional ambiguities.

Antenna arrays are generally designed for optimum directivity with high angular resolution. However, angular resolution is proportional to the size of the antenna aperture and the number of antenna elements. High angular resolution requires a large aperture with a large number of antenna elements, which increases the cost of the antenna. In addition, the size of the aperture and number of elements is limited by the antenna element spacing due to phase ambiguities. The method described hereinafter resolves the problem of phase ambiguities associated widely-spaced antenna arrays, thereby achieving unambiguous high angular resolution with a reduced number of channels. A significant cost reduction is realized by the reduction of antenna elements used in the array.

SUMMARY

According to an embodiment of the invention, there is provided a method for determining an angle of arrival of an incident plane wave received by an antenna array. The method includes receiving signals from a plurality of antenna receiving channels, determining a set of possible angles of arrival of the incident plane wave based on the signals received at the plurality of receiving channels, measuring a pulse delay of the incident plane wave between the signals received at the plurality of receiving channels, and calculating the angle of arrival of the incident plane wave based on the set of possible angles of arrival and the measured pulse delay.

According to another embodiment of the invention, there is provided a method for estimating an angle of arrival of an incident plane wave received by an antenna array having a plurality of uniformly widely-spaced antenna elements. The method includes receiving signals from the plurality of antenna elements in response to the incident plane wave, determining a phase difference between the signals received at the plurality of antenna elements, determining a set of possible angles of arrival of the incident plane wave based on the phase difference between the signals received at the plurality of antenna elements, determining a time of arrival difference between the signals received at the plurality of antenna elements, and calculating an unambiguous angle of arrival of the incident plane wave based on the set of possible angles of arrival and the time of arrival difference between the signals received at the plurality of antenna elements.

According to yet another embodiment of the invention, there is provided a system for calculating an unambiguous angle of arrival of an incident plane wave. The system includes an antenna array having a plurality of uniformly widely-spaced antenna elements, a receiver and a signal processor configured to receive signals from the plurality of antenna elements in response to the incident plane wave, and wherein the receiver and/or the signal processor are configured to determine a set of possible angles of arrival of the incident plane wave based on the signals received at the plurality of antenna elements, wherein the set of possible angles of arrival are due to phase ambiguities, measure a pulse delay of the incident plane wave between the signals received at the plurality of antenna elements, and calculate the unambiguous angle of arrival of the incident plane wave based on the set of possible angles of arrival and the measured pulse delay.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

The system and method described below are directed to resolving phase ambiguities associated with antenna arrays when determining the angle of arrival for incident plane waves. The method includes measuring the phase differences between the signals received at each antenna channel to produce a set of possible arrival angles based on phase ambiguities. These ambiguities are compared to an estimated angle of arrival that is based on time of arrival measurements taken from each antenna channel. The ambiguities are resolved by selecting an angle of arrival from the set of possible arrival angles that has the smallest absolute difference to the estimated time of arrival.

Figure 1:
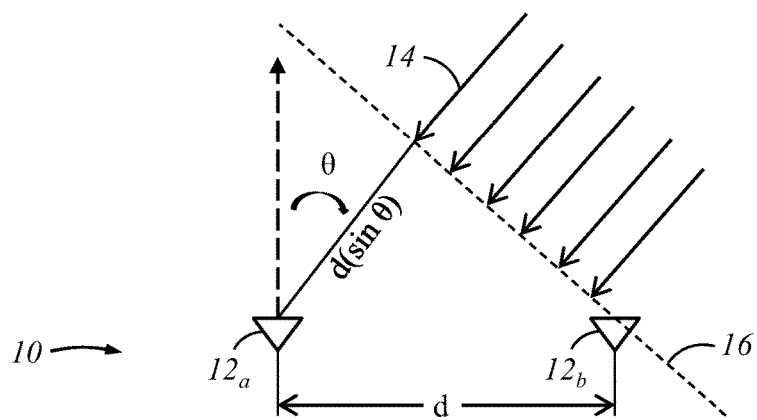
FIG. 1 is a diagram depicting a two element linear antenna array.
Figure 2:
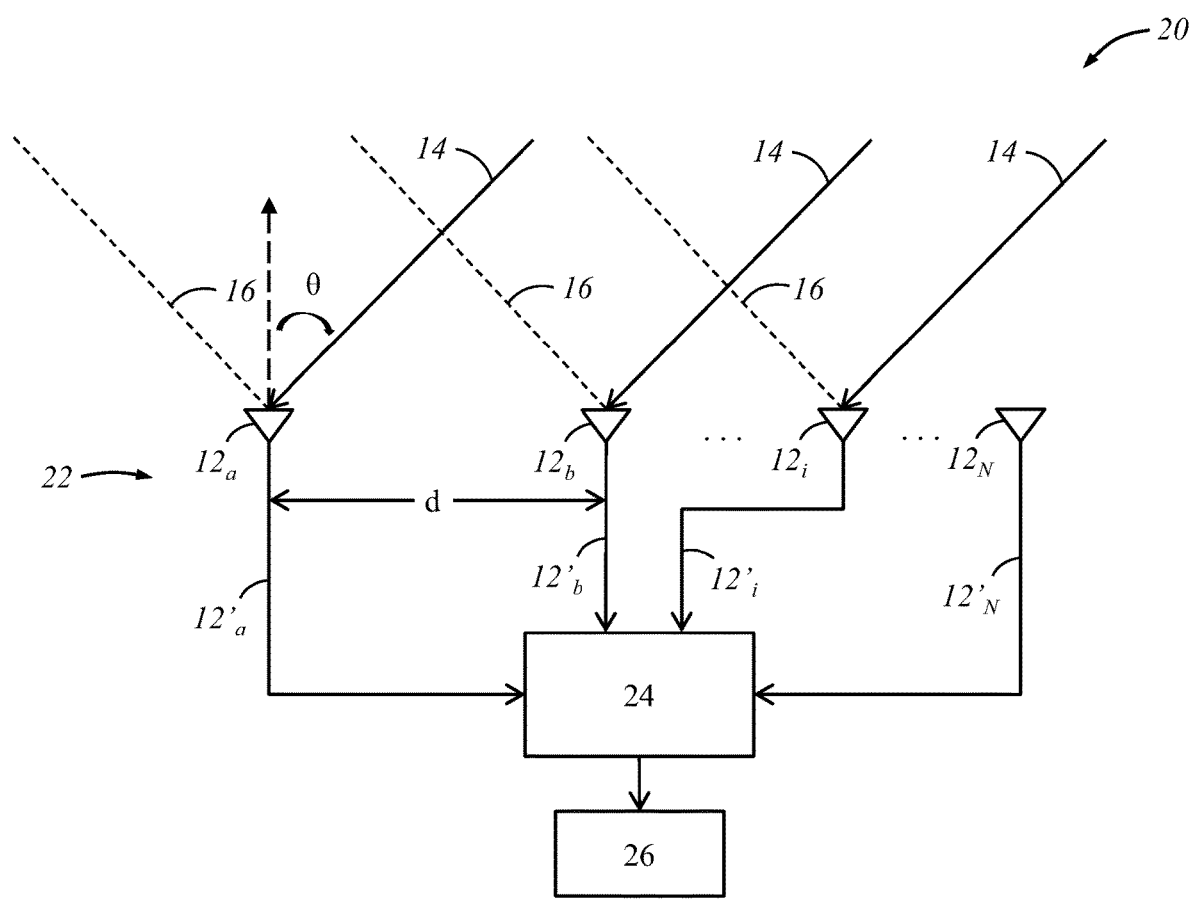
FIG. 2 illustrates an embodiment of a radar detection system capable of utilizing the method disclosed herein.

FIG. 2 illustrates an exemplary radar detection system 20 that can be used to implement the method disclosed herein. Radar detection system 20 includes a linear antenna array 22 having N uniformly spaced antenna elements $12_{a-N}$ separated by a distance d. The angle of arrival of the incoming incident signals 14 forming wave front 16 is θ, which has a span of 180°. The wave front 16 is perpendicular to the direction of the plane wave indicated by the incoming signals 14. It is assumed that all points on the wave front 16 have equal amplitude and phase values. In this embodiment, the arrival angle θ is referenced from an axis perpendicular to the plane of the array (i.e., broadside to the array) and ranges in angle from $\pi/2$ to $-\pi/2$ (90° to −90°).

Radar detection system 20 further includes a receiver 24 and signal processor 26. Receiver 24 is configured to receive signals from a plurality of antenna receiving channels $12'_{a-N}$ associated with each of the antenna elements $12_{a-N}$. The signals received from each of the antenna receiving channels $12'_{a-N}$ represents the output response from each of the antenna elements $12_{a-N}$ with respect to impinging wave front 16 and is a function of wave direction. In one embodiment, the receiver 24 may include, without limitation, amplifiers, mixers, oscillators, combiners, filters, and converters. The functions performed by the receiver 24 may vary, but generally include performing various filtering, amplification, and conversion functions prior to digitizing and transmitting the output signal to signal processor 26. The signal processor 26 is generally configured to analyze properties of the signal received by the receiver 24 to determine characteristics of the signal such as phase, frequency, and amplitude. As understood by one of skill in the art, the techniques used to extract this information from the signals may vary, but may include without limitation, in-phase and quadrature analysis and frequency domain analysis using Fourier transform. In one embodiment, the signal processor 26 may also include, without limitation, components to perform pulse compression and clutter rejection (e.g., Doppler filtering) functions.

The signals received from each of the antenna receiving channels $12'_{a-N}$ are composed of a low frequency band signal, typically referred to as base band signal (BBS) or intermediate frequency signal (IFS), which are modulated to a high carrier frequency. The resulting modulated signals are composed of a waveform envelope and a sinusoidal waveform carrier. The waveform envelope is generally a pulse train, the duration of which is related to the base-band signal bandwidth. The sinusoidal waveform inside the envelope has the frequency of the carrier frequency. The waveform envelope fluctuates at a much lower frequency compared to the sinusoidal carrier waveform. As set forth in detail below, the disclosed method utilizes both components of the modulated signal to determine the angle of arrival. In other words, each angle of arrival of an incident plane wave results in specific delay differences between each receiving antenna element $12_{a-N}$. These delay differences are captured using two different measurements: one relating to the carrier phase differences between the sinusoidal carrier waveform; and one relating to delay differences in the BBS or IFS, which measures the waveform envelope time-of-arrival arrival differences (i.e., the time difference between the leading edge of pulses). The time-of-arrival differences of the waveform envelope are hereinafter referred to as "pulse delays."

While the approach and methodology described below relate to the radar configuration shown in FIG. 2, one of ordinary skill in the art appreciates that radar detection system 20 is merely exemplary, and in many ways has been simplified for ease of explanation. One further appreciates that the concepts and method disclosed herein may be applied to any suitable radar detection system with any geometric configuration including, but not limited to, radar systems having synthetic and/or physical antenna elements uniformly or non-uniformly spaced apart and arranged as linear arrays, planar arrays, and/or conformal arrays. The antenna arrays may also be dynamic or fixed phased arrays having active or passive phase shifters. Moreover, one of ordinary skill in the art understands that the receiver 24 and signal processor 26 shown in FIG. 2 are overly simplified for ease of explanation. In practice, receiver 24 and signal processor 26 may vary in structure and complexity depending on the specific application and design criteria for the radar detection system 20. In addition, while FIG. 2 illustrates a single receiver 24 and signal processor 26 for explanation purposes, one of ordinary skill in the art appreciates that radar system 20 may be configured such that there is a separate receiver module for each of the antenna elements $12_{a\text{-}N}$, or for a sub-group of antenna elements.

Figure 3:
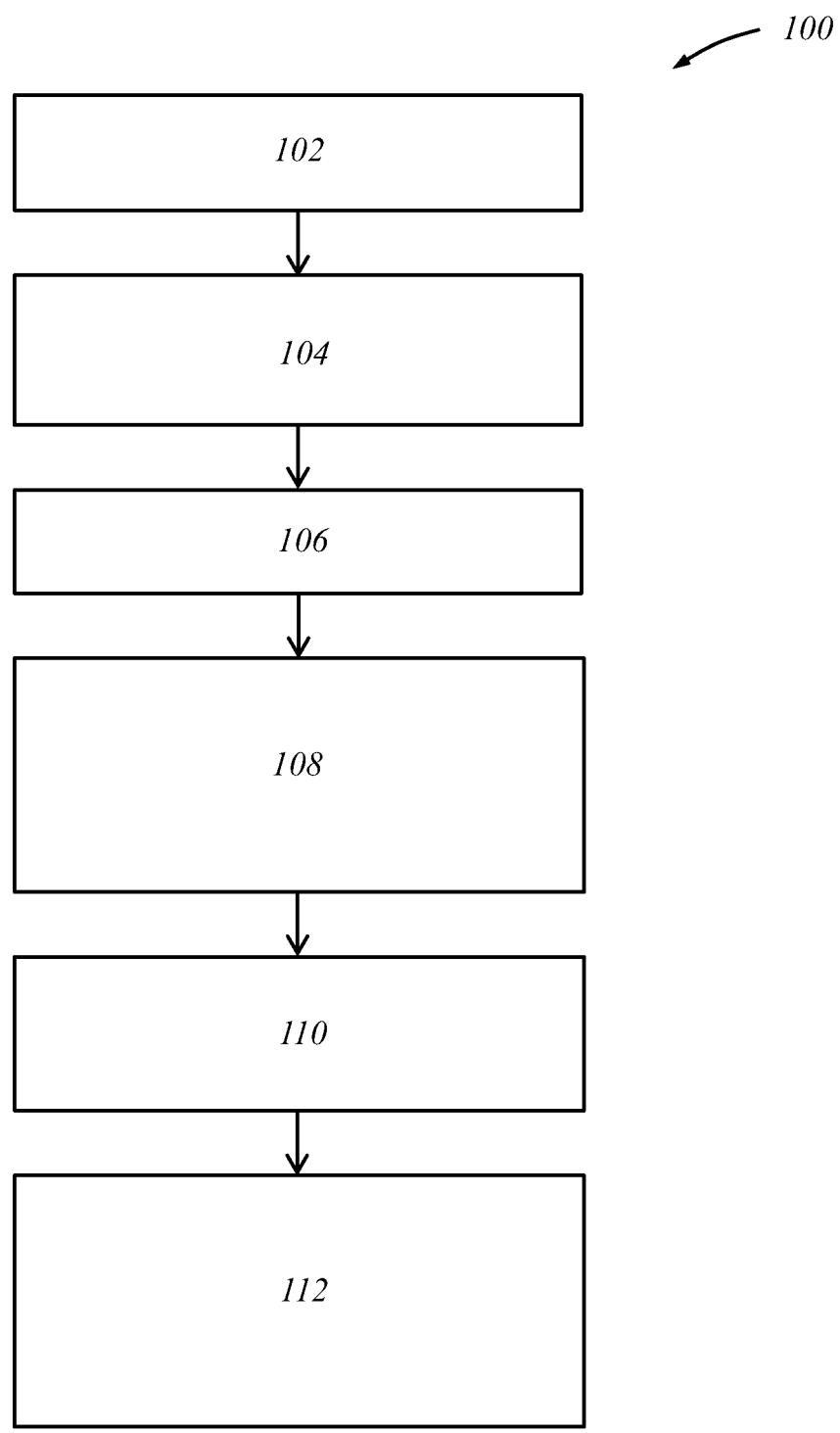
FIG. 3 illustrate a method according to an embodiment of the invention for estimating the angle of arrival for an incident plane wave.

FIG. 3 illustrates an exemplary method 100 for estimating the angle of arrival of incident plane waves and for resolving ambiguities commonly associated with widely-spaced antenna arrays, which in general is any array with uniform spacing d between the antenna elements that greater than or equal to $\lambda/2$. The method 100 described below is referenced with respect to the exemplary radar detection system 20 shown in FIG. 2, but may be implemented using any suitable radar system. At step 102, the receiver 24 receives signals from all receiving antenna channels $12'_{a\text{-}N}$. At step 104, the phase difference $\Psi$ between the signals received at the receiving channels $12'_{a\text{-}N}$ is measured. Given the known configuration of the antenna array 22, the phase difference $\Psi$ can be expressed in terms of the angle of arrival $\theta$ of the incident plane wave 16, which in one embodiment is $2\pi d/\lambda(\sin \theta)$, where the arrival angle $\theta$ is referenced off broadside, d is the distance between two antenna elements in the antenna array 22, $\lambda$ is the wavelength, and wherein $d(\sin \theta)$ represents the linear distance of the propagation delay of the wave front 16 between adjacent receiving channels $12'_{a\text{-}N}$. However, because the antenna array elements are widely-spaced, ambiguities are present in that the phase difference $\Psi$ measurements may refer to more than one possible arrival angle $\theta$. Therefore, based on the relationship between the phase difference $\Psi$ and the normalized field strength equation $E(\theta)$, at step 106 a set of possible angle of arrivals $\Omega_\theta$ is generated using known techniques. In one exemplary embodiment, $\Omega_\theta$ can be expressed as $\Omega_\theta = \{\hat{\theta}_1, \hat{\theta}_2, \ldots, \hat{\theta}_J\}$, where $\hat{\theta}$ represents the possible angles of arrival corresponding to a set of J largest peaks in the beamforming spectrum. As understood by those having ordinary skill in the art, the largest peaks in the beamforming spectrum may also refer to the maxims in the array response, which in arrays having ambiguities may include peaks in the form of grating lobes. In one non-limiting example, a technique for determining the set of possible angles of arrival $\Omega_\theta$ includes evaluating the power P for the phase-corrected sum of the received signal spectrum, referred to as the beamforming spectrum of the antenna array 22, which is a function of the angle of arrival hypothesis $\hat{\theta}$. As shown below, the power related to the beamforming spectrum references the signal received at each phase, where x is the received signal column vector, d is the distance between two adjacent elements $12_{a\text{-}N}$, $\lambda$ is the wavelength, and N is the number of antenna elements $12_{a\text{-}N}$.

$$P_{\hat{\theta}} = |[1 \ e^{-j2\pi d \sin(\hat{\theta})/\lambda} \ e^{-j2\pi 2d \sin(\hat{\theta})/\lambda} \ldots e^{-j2\pi(N-1)d \sin(\hat{\theta})/\lambda}]x|^2$$

The method 100 continues at step 108 wherein from the signals received at step 102, a pulse delay is measured between the waveform envelopes (e.g., BBS or IFS) of the signals received at the antenna elements $12_{a\text{-}N}$. From the pulse delay, a time of arrival difference $\tau$ of the incident plane wave 16 between antenna elements $12_{a\text{-}N}$ is determined. While there are many known techniques, in one embodiment, the time of arrival difference $\tau$ is determined using a matched filter response, which in general, performs a convolution on an original signal and a replica of the original signal to filter out interference and noise. The matched filter's peak epoch is the signal's time of arrival. In other words, the time at which the peak output of the matched filter occurs provides an estimate of the time of arrival difference T between the receiving channels $12'_{a\text{-}N}$. At step 110, the time of arrival difference T determined at step 108 is converted into an estimated angle of arrival $\theta_T$ using the relationship $\tau = (d/c)^*(\sin \theta_T)$, where d is the distance between each antenna element in the antenna array 22, and c is the speed of light. Angle $\theta_T$ is then the angle of arrival of the incident plane wave 16 based on time of arrival calculations between the receiving channels $12'_{a\text{-}N}$.

At step 112, the ambiguities associated with the angle of arrival of the incident plane wave 16 are resolved by comparing the set of possible angle of arrivals $\Omega_\theta = \{\hat{\theta}_1, \hat{\theta}_2, \ldots, \hat{\theta}_J\}$ generated at step 106 with the estimated angle of arrival $\theta_T$, and selecting from set $\Omega_\theta$ the angle that has the smallest absolute difference to the estimated angle $\theta_T$. Represented mathematically, the unambiguous estimated angle of arrival $\theta_E$ of the incident plane wave 16 is $\theta_E = \arg \min_{\theta_i \in \Omega_\theta} |\theta_i - \theta_T|$.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method for determining an angle of arrival of an incident plane wave received by an antenna array, the method comprising the steps of:
   receiving signals from a plurality of antenna receiving channels;
   determining a set of possible angles of arrival of the incident plane wave based on the signals received at the plurality of receiving channels, wherein determining the set of possible angles of arrival includes evaluating the power for a phase-corrected sum of a beamforming spectrum of the antenna array that references each signal of the signals received from the plurality of antenna receiving channels;

measuring a pulse delay of the incident plane wave between the signals received at the plurality of receiving channels; and calculating the angle of arrival of the incident plane wave based on the set of possible angles of arrival and the measured pulse delay.

2. The method of claim 1, wherein the signals received from the antenna receiving channels represent an output from antenna elements associated with each of the antenna receiving channels in response to the incident plane wave.

3. The method of claim 2, wherein the incident plane wave has a wavelength $\lambda$, and wherein the antenna elements are uniformly separated by a distance greater than or equal to one half of the wavelength $\lambda$.

4. The method of claim 1, wherein the set of possible angles of arrival are due to phase ambiguities.

5. The method of claim 1, wherein the set of possible angles of arrival are determined based on a phase difference measured between the signals received between the plurality of receiving channels.

6. The method of claim 1, further including determining a time of arrival difference between the signals received at the plurality of receiving channels based on the measured pulse delay.

7. The method of claim 6, wherein the time of arrival difference is determined is determined using a matched filter response.

8. The method of claim 6, further including converting the time of arrival difference to an estimated angle of arrival.

9. The method of claim 8, wherein the step of calculating the angle of arrival further includes resolving ambiguities associated with the set of possible angles of arrival by comparing the set of possible angle of arrivals with the estimated angle of arrival.

10. The method of claim 9, wherein calculating the angle of arrival further includes determining the angle of arrival from the set of possible angle of arrivals that has the smallest absolute difference to the estimated angle of arrival.

11. A method for estimating an angle of arrival of an incident plane wave received by an antenna array having a plurality of uniformly widely-spaced antenna elements, the method comprising the steps of:

receiving signals from the plurality of antenna elements in response to the incident plane wave;

determining a phase difference between the signals received at the plurality of antenna elements;

determining a set of possible angles of arrival of the incident plane wave based on the phase difference between the signals received at the plurality of antenna elements, wherein determining the set of possible angles of arrival includes evaluating the power for a phase-corrected sum of a beamforming spectrum of the antenna array that references each signal of the signals received from the plurality of antenna elements;

determining a time of arrival difference between the signals received at the plurality of antenna elements; and calculating an unambiguous angle of arrival of the incident plane wave based on the set of possible angles of arrival and the time of arrival difference between the signals received at the plurality of antenna elements.

12. The method of claim 11, wherein the set of possible angles of arrival represent ambiguities with respect to the angle of arrival of the incident plane wave.

13. The method of claim 11, wherein the time of arrival difference between the signals received at the plurality of antenna elements is based on a measured pulse delay.

14. The method of claim 11, wherein the time of arrival difference is determined is determined using a matched filter response.

15. The method of claim 11, further including converting the time of arrival difference to an estimated angle of arrival.

16. The method of claim 15, wherein the step of calculating the unambiguous angle of arrival further includes resolving ambiguities associated with the set of possible angles of arrival by comparing the set of possible angle of arrivals with the estimated angle of arrival.

17. The method of claim 15, wherein the step of calculating the unambiguous angle of arrival further includes determining the angle of arrival from the set of possible angle of arrivals that has the smallest absolute difference to the estimated angle of arrival.

18. A system for calculating an unambiguous angle of arrival of an incident plane wave, the system comprising:

an antenna array having a plurality of uniformly widely-spaced antenna elements;

a receiver and a signal processor configured to receive signals from the plurality of antenna elements in response to the incident plane wave, and wherein the receiver and/or the signal processor are configured to:

determine a set of possible angles of arrival of the incident plane wave based on the signals received at the plurality of antenna elements, wherein the set of possible angles of arrival are due to phase ambiguities, wherein determining the set of possible angles of arrival includes evaluating the power for a phase-corrected sum of a beamforming spectrum of the antenna array that references each signal of the signals received from the plurality of antenna elements;

measure a pulse delay of the incident plane wave between the signals received at the plurality of antenna elements; and calculate the unambiguous angle of arrival of the incident plane wave based on the set of possible angles of arrival and the measured pulse delay.

19. The system of claim 18, wherein the receiver and/or the signal processor are configured to convert the pulse delay into an estimated angle of arrival.

20. The system of claim 19, wherein calculating the unambiguous angle of arrival further includes determining the angle of arrival from the set of possible angle of arrivals that has the smallest absolute difference to the estimated angle of arrival.

* * * * *